US010893238B2

(12) United States Patent
Eilertsen

(10) Patent No.: US 10,893,238 B2
(45) Date of Patent: Jan. 12, 2021

(54) VIDEO SHARING SYSTEM FOR ROAD USERS

(71) Applicant: Roger André Eilertsen, Askim (NO)

(72) Inventor: Roger André Eilertsen, Askim (NO)

(*) Notice: Subject to any disclaimer, the term of this patent is extended or adjusted under 35 U.S.C. 154(b) by 210 days.

(21) Appl. No.: 14/762,587

(22) PCT Filed: Jan. 24, 2014

(86) PCT No.: PCT/EP2014/051411
§ 371 (c)(1),
(2) Date: Jul. 22, 2015

(87) PCT Pub. No.: WO2014/114754
PCT Pub. Date: Jul. 31, 2014

(65) Prior Publication Data
US 2015/0365632 A1    Dec. 17, 2015

(30) Foreign Application Priority Data

Jan. 24, 2013  (EP) .................................... 13152551
Oct. 7, 2013   (EP) .................................... 13187482

(51) Int. Cl.
H04N 7/00      (2011.01)
H04N 7/18      (2006.01)
(Continued)

(52) U.S. Cl.
CPC ............... *H04N 7/181* (2013.01); *G08G 1/01* (2013.01); *G08G 1/164* (2013.01);
(Continued)

(58) Field of Classification Search
CPC .. H04N 7/18; H04N 9/09; G08G 1/16; G08G 1/0965; G08G 1/00; G08G 1/202;
(Continued)

(56) References Cited

U.S. PATENT DOCUMENTS 7,683,937 B1 * 3/2010 Blumenfeld ....... H04N 5/23203
                                                    348/211.11
2002/0167589 A1 * 11/2002 Schofield ............... B60N 2/002
                                                    348/148

(Continued)

FOREIGN PATENT DOCUMENTS

DE    10 2008 009 330 A1    6/2009

OTHER PUBLICATIONS

International Search Report dated Jun. 24, 2014 in corresponding International Application No. PCT/EP2014/051411.

*Primary Examiner* — Frank F Huang
(74) *Attorney, Agent, or Firm* — Wenderoth, Lind & Ponack, L.L.P.

(57) ABSTRACT

A traffic surveillance and guidance system comprising a traffic server system is disclosed. The traffic server is configured to receive and update and record data of geographical positions of registered road users, and wherein each registered road user is registering a replaceable and modifiable geometrically shaped model of a field of view representing the respective road users observation space and observation ability of possible traffic incidents around geographical positions the respective road users are located on at any time.

15 Claims, 8 Drawing Sheets

(51) Int. Cl.
 *G08G 1/16* (2006.01)
 *G08G 1/01* (2006.01)
 *H04N 21/2187* (2011.01)
 *H04N 21/414* (2011.01)
 *H04N 21/4223* (2011.01)

(52) U.S. Cl.
 CPC ... *H04N 21/2187* (2013.01); *H04N 21/41422* (2013.01); *H04N 21/4223* (2013.01)

(58) Field of Classification Search
 CPC ............ B60R 2300/30; B60R 2300/00; B60R 2300/70; B60R 2300/50; H04W 84/005; H04W 84/18; H04H 20/71; H04H 60/80; G06F 15/16; G06Q 10/10; G01C 21/34; G01C 21/36
 See application file for complete search history.

(56) References Cited

U.S. PATENT DOCUMENTS

| | | | |
|---|---|---|---|
| 2007/0038567 A1* | 2/2007 | Allaire | G06Q 30/0239 705/50 |
| 2009/0231432 A1* | 9/2009 | Grigsy | G08G 1/161 348/149 |
| 2010/0284384 A1* | 11/2010 | Stahlin | H04W 76/002 370/338 |
| 2010/0303048 A1* | 12/2010 | Stahlin | H04W 84/12 370/338 |
| 2011/0098877 A1* | 4/2011 | Stahlin | G08G 1/161 701/31.4 |
| 2011/0128902 A1* | 6/2011 | Guo | G08G 1/161 370/312 |
| 2011/0177791 A1* | 7/2011 | Stahlin | B60R 25/102 455/404.2 |
| 2011/0246594 A1* | 10/2011 | Cobbold | G06Q 10/10 709/206 |
| 2012/0062743 A1* | 3/2012 | Lynam | B60Q 9/005 348/148 |

* cited by examiner

VIDEO SHARING SYSTEM FOR ROAD USERS

FIELD OF THE INVENTION

The present invention is generally related to traffic surveillance and guidance systems collecting and providing traffic information to registered road user members like commuters, people driving their cars and/or people utilizing public transports etc., wherein the system communicates with the road users via mobile terminals such as mobile phones, Global Positioning System (GPS) navigation terminals in cars etc., and especially to a traffic surveillance and guidance system providing sharing of video streams from video cameras operated by registered road users of traffic conditions around the respective registered road users.

BACKGROUND OF THE INVENTION

The European Patent application 13152551 with the title "A traffic surveillance and guidance system" by the same inventor as the present application, disclose a traffic information and guidance system providing a communication channel for example between road users driving their respective cars. Each driver has a field of view and the basic concept is that it is possible to combine the field of views of a plurality of road users, or just between two drivers driving for example on a same road. FIG. 1 illustrates schematically a combined field of view between a road user in car A with a field of view 10, field of view 11 of a road user in car B and a field of view 12 of a road user in car C. Some of the technical features of the invention enabling this concept are that each road user registers himself as a member and user of a server system providing for example traffic information services. When registering, a road user selects a specific geometrical shape and size representing a model of his intended field of view, for example a circle of 500 meters diameter. The server tracks geographical positions, for example the Global Positioning System (GPS) coordinates of cars or of mobile terminals associated with the registered road users, for example by tracking GPS positions of a GPS navigation terminal in a car, and/or mobile phones or mobile terminals like an iPad etc. registered to road users, and which the road users carries with them. The tracking system may also be combined with hybrid positioning systems providing improved resolution of positions both outside and inside buildings. When a driver is on the road the server may identify, based on the dimensions of the modelled field of views and the tracked geographic positions of the associated user of the field of view, that the modelled field of view is partly overlapping the modelled field of views of other registered users of the system. A union of respective field of views are established and is maintained as long as a partly overlap is identified to exist between them. In a union the server will establish at least a communication channel or a message distribution process between the members of the union. When there is no partly overlap between a specific user's field of view with any other fields of views of other members of the union the at least established communication link or message distribution process to and from this specific user is terminated.

When one member of a union detects for example a traffic incident that will influence the traffic flow, for example a traffic accident, the member can signal other members in the union about the incident just by pushing a "report accident" button, or a "report traffic queue" button for example on the display of his GPS navigation unit in the car, or mobile phone. This message is then sent via the communication channel or message distribution process within the union to the other members of the union, but without any identification about who sent the message. The messages can be stamped with time, date and GPS coordinates of the location the messages were sent from for example. Besides being distributed within a union the server may record messages and in this manner the server may keep updates and history of incidents in lists, and optionally update navigation maps with graphical symbols on locations an incident has occurred, for example. The server may also perform an arbitration process removing conflicting messages distributed in a union. The concept of a "road user" is a broad concept comprising also petrol stations etc. that also may have a "field of view" definition. Whenever a road user forms a union with a petrol station the communication between the petrol station and the road user may be for example to inform the road user about current prices on petrol from this petrol station.

Within the concept of "field of view" the inventor of the present invention has realized that there is a broad concept related to the term "field" while the term "view" is a qualifier of the term "field". With reference to field theory of physics the term "qualifier" can be viewed to be equivalent to the use of terms like gravitation, electromagnetism and hence to the field theory of gravitation, the field theory of electromagnetism etc. The qualifier then indicates the type and nature of the interactions that may appear within the qualified field.

Therefore, in view of the new trend among car manufactures to equip cars with video cameras and Internet capabilities allowing streaming of video from cars to others it is within the scope of the present invention to define video fields, and whenever a union between video fields has been established video streams may be shared within the union. If a video camera is not equipped with Internet capabilities it is within the scope of the present invention to facilitate Internet connectivity of the video camera via other mobile equipment installed or which is installable in cars with wireless communication possibilities.

One class of cameras are denoted dash cams which are a short form for dashboard mounted cameras. Therefore, it is within the concept of the present invention to use fields qualified as video fields for dash cams, and whenever respective video field's forms unions according to the present invention streaming of video among registered road users of a traffic server according to the present invention can be facilitated within a video union.

However, it is important to distinguish between the optical view and viewing angles etc. a video camera may have compared to the functioning of a video field according to the present invention. First of all, a video field associated with a road user is a signal to others that the road users have a video camera that the road user is willing to share with others. The size and shape of the video field defines within which relative area with respect to the road users own location at any time that he is willing to share and receive video streams. In a sense it defines the area the road user himself believes is important for him to have this extended field of view opportunity. Therefore, as disclosed in the European patent application 13152551, when a road user is registering as a user of the server system he may define a specific but changeable and modifiable shape and size of a video field defining an area relative to his position on roads at any time he believes he would be able to provide video streams of relevance to others as well as being able to receive video streams of relevance to himself.

US 2009231432 by Grigsy Travis et al disclose a vehicle to vehicle network configured to submit video streams from video cameras in the respective vehicles to the other participants over the network. According to the teaching of Grigsy et al the system identifies which video stream most participants are watching, and then this video stream is submitted to all participants in the network.

The main challenges for road users driving a car for example, is to be able to view and assess road conditions in the vicinity of the current position of the car on the road, for example 500 meters ahead, or a kilometre ahead. Usually it is not of interest to know road conditions the driver will encounter after driving an hour, for example. However, condition on side roads where buildings between the road user and the side road is blocking the view may be of outmost importance. Hence, a video solution enabling a transfer of video streams from a car on side streets to the road user's car for example, where the road user can view the situation, would be extremely beneficial. In a sense this would allow a road user to see around corners.

It is known to create groups, for example a commuter group that can share information about road conditions like for example sharing videos. However, members of a commuter group with video capabilities may move away from each other and the benefits of sharing videos are lost. Therefore, the problem is to identify a car and a member for example being located on an opposite side of for example a building on a side road (thereby probably being invisible) that has a streaming video camera in the car that can distribute the video to any other road user requesting the video stream.

However, the challenge is to find who is within this certain geographical area and to know if they are willing to share video with other road users and still be able to maintain for example their privacy. They must also be willing to receive video streams. What then about road users being located close to the boundaries of the specific geographical area? Or is moving in or out of the specific geographical area? A road user being located just outside the boundaries of the geographical area may also need information that is deemed to be relevant for road users within the specific geographical area. In a broad sense the problem is related to locate random road users randomly located relative to each other within a random time spam to share for example their relevant video streams and observation capability with each other and the traffic server during the random time span.

Therefore, there is a need of an improved traffic server system providing ease of providing video streaming between road users that can submit videos from cars having video cameras to other cars having video display systems.

Hence, an improved traffic server system would be advantageous, and in particular a more efficient and/or reliable traffic server system would be advantageous.

OBJECT OF THE INVENTION

It is a further object of the present invention to provide an alternative to the prior art.

In particular, it may be seen as an object of the present invention to provide a traffic surveillance and guidance system providing communication with road users that solves the above mentioned problems of the prior art by providing tools for generating and controlling unions with video communication capabilities of respective video observation space and video observation ability of respective road users being in geographical positions providing a partly overlapping of each respective road user's video observation spaces.

SUMMARY OF THE INVENTION

According to an aspect of the present invention, such an improved system is possible based on a concept of a dynamic and/or temporary establishment of a union of video fields of respective video systems associated with road users ((road user 1) U (road user 2) U . . . (road user i)), thereby the road user's video fields are combined, and video observation abilities are joined. Therefore, a union may provide sharing of the video observation space and video observation ability of each respective road user with streaming video in such a manner that each respective road user achieves access to video streams from members in the union having video systems and that can be viewed on a video display. In this manner the present invention provides a possibility of creating a physical field of view conveyed via video that is outside the physical boundaries of own field of view.

According to a further aspect of a traffic surveillance and guidance system according to the present invention, when a union between respective road users are established, a video distribution process is established by the system between road users that are in the union, and the system itself. Any one of the road users in the union may issue a request for video streams. The effect is that this request is shared by all the road users, inclusive the server, in the union and they may respond to the update request by providing information about video streams they can supply in their part of the field of view of unions.

According to an example of embodiment of the present invention, a union with video streaming handling capabilities is created automatically without any user interference between road users when their respective video fields starts to be partly overlapping, and the union lasts as long as there is at least a partly overlapping between the respective video fields.

Thus, the above described object and several other objects are intended to be obtained in a first aspect of the invention by providing a traffic surveillance and guidance system comprising a traffic server system configured to provide acquisition of traffic information from a plurality of information providers and a plurality of registered road users of the traffic server system, and further being configured to provide video streaming between video systems of registered users of the traffic server, wherein the traffic server is configured to receive and update and record data of geographical positions transmitted from mobile terminals associated with registered road users, and wherein each registered road user is registering in the traffic server system a replaceable and modifiable geometrically shaped model of a video field representing the respective road users video observation space and video observation ability of traffic conditions and incidents around geographical positions the respective road users are located on at any time, the traffic server is configured to follow movements of road users based on the received and recorded geographical positions, and whenever the traffic server detects that relative movements between road users is providing a situation wherein the modelled video fields of at least two road users are partly overlapping, the traffic server is configured to establish a union between the at least two video field, wherein the union is configured to provide at least a video distribution process between the at least two road users enabling distributions of video streams related to traffic conditions and incidents observed by the at least two road users in the union, the traffic server is further configured to cancel the at least provided video distribution process to or from a specific road user if the relative movement of the specific road user with respect to the union is providing a situation where there is no longer a partly overlapping of the specific road user's modelled video field with any other modelled video field of other road users in the union.

According to an example of embodiment of the present invention the traffic server is configured to be a traffic server among a plurality of traffic servers, wherein each respective traffic server is configured to support road users in a specific defined geographical area, and wherein the plurality of traffic servers further is configured to exchange data related to a road user when the road user is entering a specific geographical area served by another traffic server.

According to an example of embodiment of the present invention the traffic server is by default in respective unions with respective road users, thereby the system is providing a plurality of independent default unions wherein each respective default union has two road users, the server and a road user, and when a first road users and a second road user in respective default unions with the server have partly overlapping field of views the union that is formed will have three road users, the server and the first road user and the second road user.

According to an example of embodiment of the present invention a road user can be at least one of a person driving a car, cars themselves, persons riding motorbikes, motorbikes themselves, pedestrians, commuters, metro line, railway line, trains, aeroplane route, aeroplane, people travelling on bicycles, bicycles, road traffic reporters in helicopters, helicopters, ferry, toll road station, cafeteria, bus terminal, bus, atelier, taxi, traffic light, and also other traffic server systems etc., and similar persons and objects.

According to an example of embodiment of the present invention geographical positions of registered road users are identified by data submitted from Global Positioning System (GPS) transmitters being part of Mobile terminals accompanying registered road users of the traffic surveillance and guidance system (20).

According to an example of embodiment of the present invention geographical positions of registered road users are identified by data submitted from hybrid positioning systems.

According to an example of embodiment of the present invention a registration of a road user comprises assignment of optional parameter values modifying perception of video streams received by the road user when being in a union, and/or other activities in the union.

According to an example of embodiment of the present invention registered information related to a road user is defined as a data set being organised as an indexed collection of information elements, wherein a pointer structure in the data set is updated by the server providing information about which other data sets of other users that are in a union with each other.

According to an example of embodiment of the present invention the data set comprises updated data of geographical position data of a road user associated with the data set, and wherein data sets of a union can optionally be sorted in respective sequences with respect to the geographical positions updated in the respective data sets, and wherein a specific video stream from a road user located in a sorted sequence is distributed only to other road users in the sorted sequence of data sets that are requesting the specific video stream.

According to an example of embodiment of the present invention a sorted list with respect to the geographical positions of road users in the union, can be lists sorting road users on respective side roads on a left and respectively right hand side of a selected direction of a main road relative to the side roads.

According to an example of embodiment of the present invention the traffic server system is configured to receive a request of receiving video streams from a specific road user via an interaction tool configuration of a video display of the specific road user, wherein the interaction tool configuration is configured to request video streams from a specific video camera in the union by touching a graphical symbol representing the geographical position of the video camera on an interactive display surface of the video display, or by moving a cursor on the video display surface over the graphical symbol representing the video camera and then activate the selection with a push button of the interaction tool configuration.

According to an example of embodiment of the present invention the interaction tool configuration comprises selecting a direction to a next video camera listed in lists of video cameras sorted according to geographical relative positions of the video cameras, and relative to an identified direction of travel of a road user making a request for a video stream, either a next video camera in line in front of the road user, or a next video camera in line to the left of the road user, or a next video camera in line to the right of the road user, or a next video camera in line behind the road user.

According to an example of embodiment of the present invention a parameter value indicating direction of travel can be assigned as an optional parameter value thereby restricting video streaming from video cameras pointing substantially in a same direction as the direction of the travel of road users.

According to an example of embodiment of the present invention the distribution of video streams in a union from video cameras in the union to video displays in the union is established over an Internet distribution of the video streams between respective Internet addresses of the video cameras and the video displays stored in data sets associated with each respective road user in the union.

According to an example of embodiment of the present invention each respective traffic server serving respective geographical areas is configured to have respective unions with public video cameras located at fixed points along roads providing video streaming of traffic conditions around the fixed points, and whenever movement of a road user provides a situation where the road user is in a union with the server and a specific public video camera, the road user is enabled to view the streaming content of the video camera inside the union.

According to an example of embodiment of the present invention geographical positions of registered road users are identified by data submitted from hybrid positioning systems.

According to an example of embodiment of the present invention a registration of a road user becoming a registered road user of the system comprises providing authentication of the road user's identity and optionally a downloading of a mobile application program from the server to Mobile terminals the road user is registering with the server in addition to other information elements.

According to an example of embodiment of the present invention registration of road users can be from data located in a user register related to a social network.

According to an example of embodiment of the present invention wherein the traffic surveillance and guidance system is configured to parse a friends list in the social network of a road user from the social network being in a union, and whenever the server identifies that a friend on the friends list is a member of the same union, the server notifies both road users about their presence in the same union.

According to an example of embodiment of the present invention the traffic server system is adapted to be part of an assault alarm system, and wherein any registered user of the assault alarm system can optionally be registered road users, and whenever a union is created among users of the assault alarm system, video from a mobile phone carried by a member is enabled by the server to be streaming video to other member's mobile phones in the union and the server itself if the member activates an alarm button on the mobile phone.

According to an example of embodiment of the present invention the assault alarm system is configured to identify registered names of persons being inside the union, and also person in surrounding areas of the union, and then submit the names to a law and order enforcement authority when a road user has submitted an alarm.

Respective aspects of the present invention may each be combined with any of the other aspects. These and other aspects of the invention will be apparent from and elucidated with reference to the embodiments described hereinafter.

FIGURES

The traffic surveillance and guidance system according to the present invention will now be described in more detail with reference to the accompanying figures.

The accompanying figures illustrates an example of embodiment of the present invention and is not to be construed as being limiting to other possible embodiments falling within the scope of the attached claim set.

DETAILED DESCRIPTION OF AN EMBODIMENT

Figure 1:
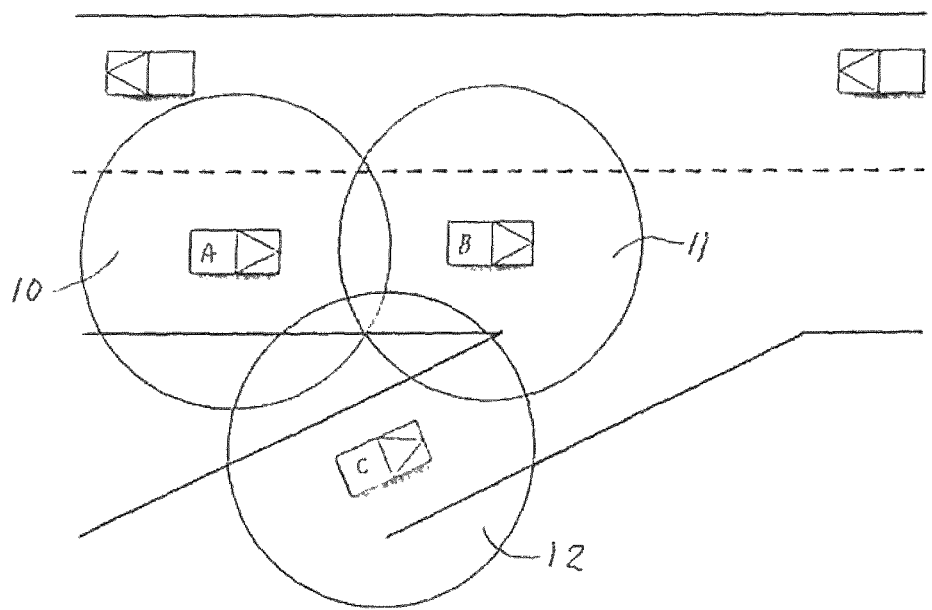
FIG. 1 illustrates an example of a union according to the present invention.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

According to an aspect of the present invention the term road user is to be understood as a term comprising persons driving cars, cars themselves, motorbikes, pedestrians, commuters, metro line, railway line, trains, aeroplane route, people travelling on bicycles, road traffic reporters in helicopters, helicopters, ferry, toll road station, cafeteria, bus terminal, bus, work shop, atelier, taxi, traffic light, and also traffic server systems etc., and similar persons and objects. The idea is that any persons, institutions, objects, transport means, point of interests and similar information sources etc. that can provide information and help relevant for traffic surveillance and guidance, can be registered as a road user in an example of embodiment of the present invention. For example, a petrol station may provide information about latest petrol prices and can be registered in the system as a road user. A traffic light may inform the number of minutes left before changing light colour etc.

Within the concept of the present invention, a traffic surveillance and guidance system should be able to facilitate mutual interactions between participating road users within the broad meaning of the term "road user".

A new user of the system according to the present invention needs to register his credentials like name, address, mobile phone number and similar information etc. besides information about his car if he have one, if he has a navigation terminal in his car, type of model etc., and for example type of video camera in his car which can be updated and recorded in a user profile for example. In the user profile the user may define a geometrical shape as a model of his field of view in addition to a video field. For example, if the user is only interested in what is happening on the ground level around for example a car when driving the car, the user can define his field of view as being a horizontal circle with centre in the car. The diameter can be defined to be for example 500 meter. If the registered road user is more interested in what is happening in front of a car when driving, it is possible to define an ellipse wherein the road user will be positioned in one of the foci while the other foci is in front of the road user, or just a rectangle around the car positioned with a larger part of the rectangle in front of the car. With respect to a video field definition the shape and size may be defined as the field of view definition but can be different. An aspect of defining a separate field for video streams is that this simplifies architecture of a server system according to the present invention. However, this aspect is outside the scope of the present invention and will not be discussed further.

At any time it may be possible for the road user to replace and/or modify the geometrical definition of the field of view or video field in his user profile. Any geometrical shape may be defined and/or be modified by a road user. In an example of embodiment of the present invention there is defined a default shape of the field of view or video field that may be assigned by a system operator to be for example a horizontal circle with a radius of 400 meters, or any other shape and size. When the server system detects that the relative geographical positions between at least two road users implies that their respective modelled video fields starts to be partly overlapping the server system provides at least a video communication link or video distribution process between the at least two road users. The video communication link or any type of video distribution process between the at least two road users are maintained as long as their respective video fields are overlapping, i.e. as long as the video field are forming a union.

An example of embodiment of the present invention comprises a computer system denoted "traffic server" that is receiving relevant traffic information from a plurality of information sources, wherein the server is capable of for example communicating relevant traffic information and guidance to/from respective mobile terminals registered to road users of the system, or that are for example located in vehicles operated by the road users. The traffic server system may keep track of positions of all registered road users in a geographical area based on for example GPS coordinates, or from systems denoted hybrid position systems. For example, a relational database that has been adapted to geographical queries, for example like the commercial systems PostgreSQL+PostGIS or Oracle Spatial and Graph may be used to identify geographical names linked to geographical positions of registered users. When a video union among road users are detected the server system creates a video communication link or a video distribution process between road users in the meaning of the broad interpretation of the term "road user" that facilitates interchange of traffic relevant information and help and advice between road users in the union.

Figure 8:
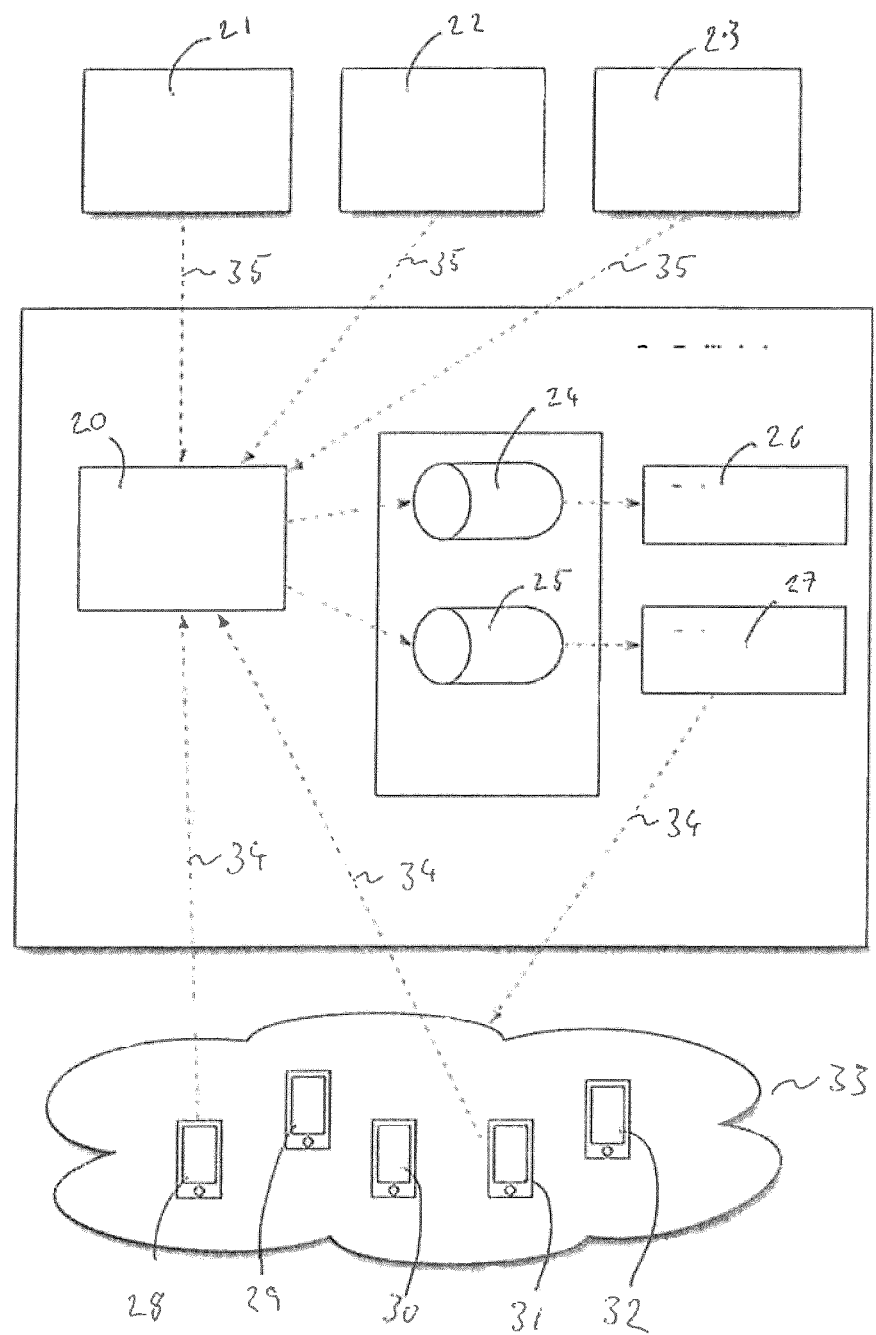
FIG. 8 illustrates an example of system architecture according to the present invention.

FIG. 8 illustrate an example of system architecture of an example of embodiment of the present invention. The traffic server 20 is receiving traffic related updates from different sources like the information providers 21, 22, 23. Information provider 21 may be a road maintenance company, information provider 22 may be a public transport information provider, and information provider 23 may be an air traffic information provider.

Traffic related messages are processed in the traffic server and may then be transferred to a traffic message queue 25. A dedicated traffic message processor 27 is then responsible for sending a push message to relevant registered road users 28, 29, 30, 31, 32. The system may keep track of all geographical positions of registered users via GPS coordinates and a geographical relational database being part of the traffic server 20 as mentioned above thereby qualifying messages to be relevant for specific unions the respective road users are located within. The message process will also take into account if a road user is active or passive as discussed above.

When a new user of the traffic server system according to the present invention is registering his credentials, a mobile phone application (app) of the traffic system may be downloaded into the user's mobile phone. If any other type of mobile terminal is used, for example a Geographical Position System (GPS) navigation terminal, an appropriate application program may be downloaded to the GPS navigation terminal providing the same level of services and functions as with the mobile phone. Part of downloaded software may be respective interfaces for a video camera and/or a video display situated in a car used by the road user. A video system and/or a video display are referenced below as a video system.

It is within the scope of the present invention to keep track of positions of mobile telephones and navigation terminals being equipped with GPS transmitters with the help of hybrid position detection systems that can improve resolution of position accuracy, and which can be used inside buildings etc. and which can function in cooperation with the GPS system. For example, Cellular phone Tower triangulation methods are known in prior art, or any other device or method that can keep track of geographical positions may be used. The link below provides an overview of possible solutions. http://en.wikipedia.org/wiki/Hybrid_positioning_system.

The traffic surveillance and guidance system according to the present invention may keep track of geographical positions of registered road users being logged into the server by receiving geographical location coordinates from mobile terminals associated with the registered road users. According to an example of embodiment of the present invention the mobile app (or WEB interface) may comprise a user selectable option of enabling active use of the system, or passive use of the system, or be logged out completely of the system. If the road user selects active use of the system the user defined geometrical shape of the video field (or default shape) of the road user is actively used by the traffic server together with other optional functions like a relational database that has been adapted to geographical queries, for example. The passive use can restrict the server to only send messages about accidents, or broadcast messages etc. to the passive user(s). The tracking of geographical positions of users will be disabled in the passive mode if selected so by the users. This is a choice a road user can use when parking at a road café for example.

According to an example of embodiment of the present invention, the traffic server may be configured to identify the perimeter of the defined models of video fields, for example the perimeter of a circle. If the circle for example has been defined to be 500 meters in diameter the system may convert points on the perimeter into relative geographical positions relative to the position of the mobile terminal of the road user for example. When the road user moves for example in a car the absolute geographical positions of the mobile terminal the road user is carrying will be tracked and updated by the traffic server of the present invention. At the same time the absolute position of the perimeter of the field of view can easily be calculated by just adding the relative coordinates of the perimeter to the absolute position of the mobile terminal. In this simple manner it is possible for the server system to detect unions of fields of views.

If a road user being part of a union departs from the union, for example if he is driving a car and stops at a petrol station he will probably no longer be in the union. This is detected by the traffic server system monitoring active road user's relative positions in unions. The traffic system may for example from time to time control the consistency of different established unions and then remove a road user that has a position disabling his possibility to be in the union, or add another road user. This is actually no real problem for the other registered road users being in the union. The road user that stopped will no longer provide relevant traffic observations to the other road users in the union anyhow. A new road user will for example be able to report additional information. When the stopped road user starts moving again, for example in his car, he can eventually be part of a new union when his video field again starts overlapping with another video field of another road user (or the previous union if he catch up with these cars again on the road), or an already initiated and existing union. If a road user is in no union at all with other road users he may still be in a default union with the server. In this manner the traffic server can update the road user with traffic information if necessary. It is within the scope of the present invention that besides providing video communication links or a video distribution process providing update of traffic conditions in a created specific union of road users and between road users in the union, the traffic server can also be registered as a road user in itself. Therefore, in an example of embodiment of the present invention, there will always be a plurality of respective individual default unions created between the traffic server in the system and each respective registered user. This example of a union is based on a concept of logical overlap of the field of views of the road user and the broad scope of traffic conditions the traffic server may observe and receive. The default unions have two road users, i.e. a user and the server. If another user becomes a road user of this union the union will have three road users. The server, the first user, and the second user are then road users. If the union is split the first user will remain in a union with the server while the second user will also remain in a union with the server.

An example of functions provided for in a default union is that a server can be informed and configured to distribute video from public video cameras positioned by respective authorities along for example main roads distributing video of road conditions live. Such video streams may be distributed in default unions.

Inside unions there can be a message handling system being implemented within a publisher subscriber architecture as known to a person skilled in the art, for example as middleware.

Format of messages being used for example in a message-oriented middleware are made as structured as possible thereby providing a possibility to perform filtering, routing, and translation between languages for example. A typical message about an incident on a road may comprise: direction of travel, type of incident, location of incident, and optional additional information like a voice mail message, or a video, or a recording of sound/voices. It is also possible to use colors in messages, for example red to signify danger or green to signify clear road forward etc.

Figure 3A:
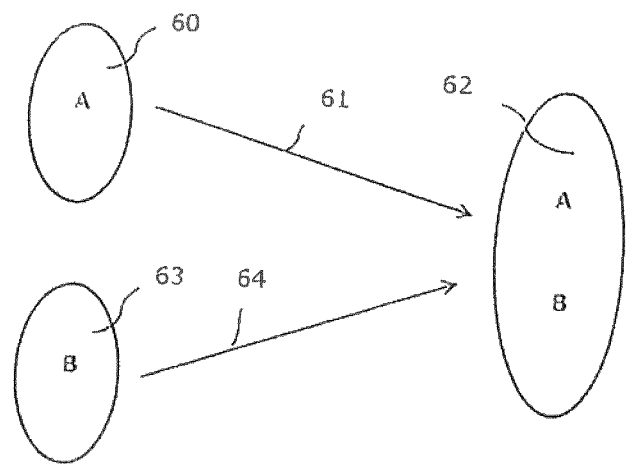
FIG. 3a illustrates an example of forming a union according to the present invention.
Figure 3B:
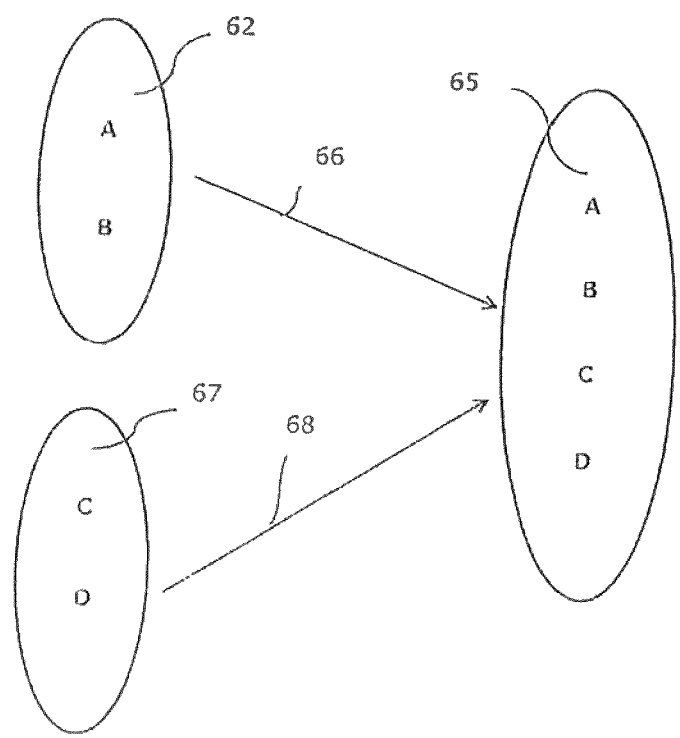
FIG. 3b illustrates another example of creating a union according to the present invention.

In FIG. 3a there are illustrated two data sets A and B respectively associated with a user A and user B. The data sets may be viewed as being the user profile being registered and updated for a user. In FIG. 3b the respective users associated with data set A and data set B are moving geographically close to each other and can form a union as indicated with the arrows 61, 64. Internally in the server, the union that is created can be viewed as a new data set U1 (reference numeral 62 in FIG. 3a), (union one, for example), with the information elements from data set A and data set B combined. The system can then also provide an ID for the union, for example U1.

If there is a union U2, as depicted in FIG. 3b with reference numeral 67, between other registered users defined in corresponding data sets C and D, a union U3 (reference numeral 65) may be formed between U1 and U2, which is indicated with the arrows 66, 68. In an example of embodiment, the server may, when a union is formed, optionally provide an updating of a combined field of view. The essence of providing an updated field of view is to provide a field of view being relevant for a specific member of a union. For example, it can be of more importance to a road user that his physical field of view and his virtual field of view is related to what is happening in front of him instead of behind him, or at any other randomly possible direction, in the combined field of view of a union. This aspect is discussed in more detail below.

Figure 4:
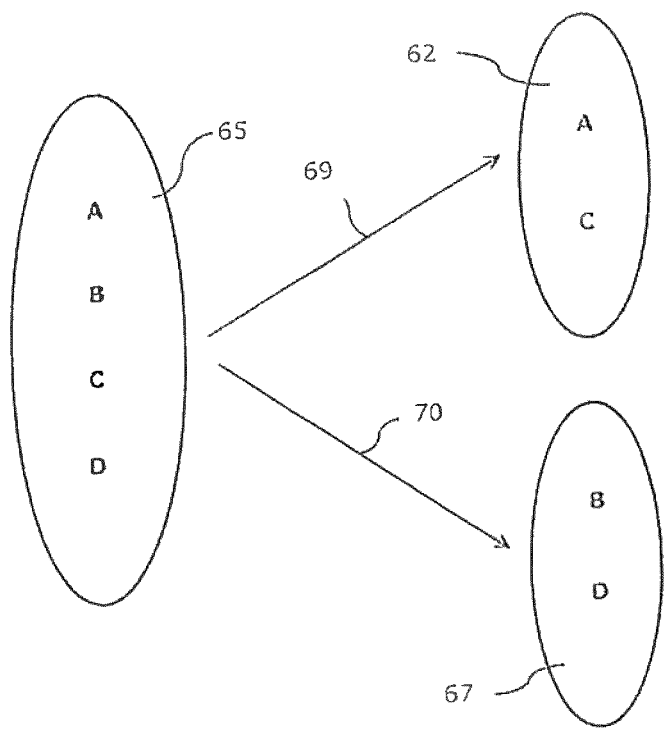
FIG. 4 illustrates an example of splitting a union according to the present invention.

When a member of a union is leaving a union, this can be detected by the server, for example by detecting a change in distances between respective GPS positions in the updated data sets of users in a union. The process of detecting a member of a union leaving the union can also be detected just by a process that at regular time intervals re-establish a union according to the respective distance rules derived from the respective defined fields of views. This is possible since the goal of the present invention is not to keep track of individual members as such, but merely to identify unions and maintain communications or message distribution inside unions. If none of the members of a union being re-established no longer satisfies the distance rules or other rules, the union is automatically dissolved since it will not be re-established. In FIG. 4 it is illustrated how for example U3 is split or re-established again into separate unions U1 and U2. However, when a union is split or re-established the members in the respective unions U1 and U2 can be different from the situation when U3 first was formed.

Figure 5:
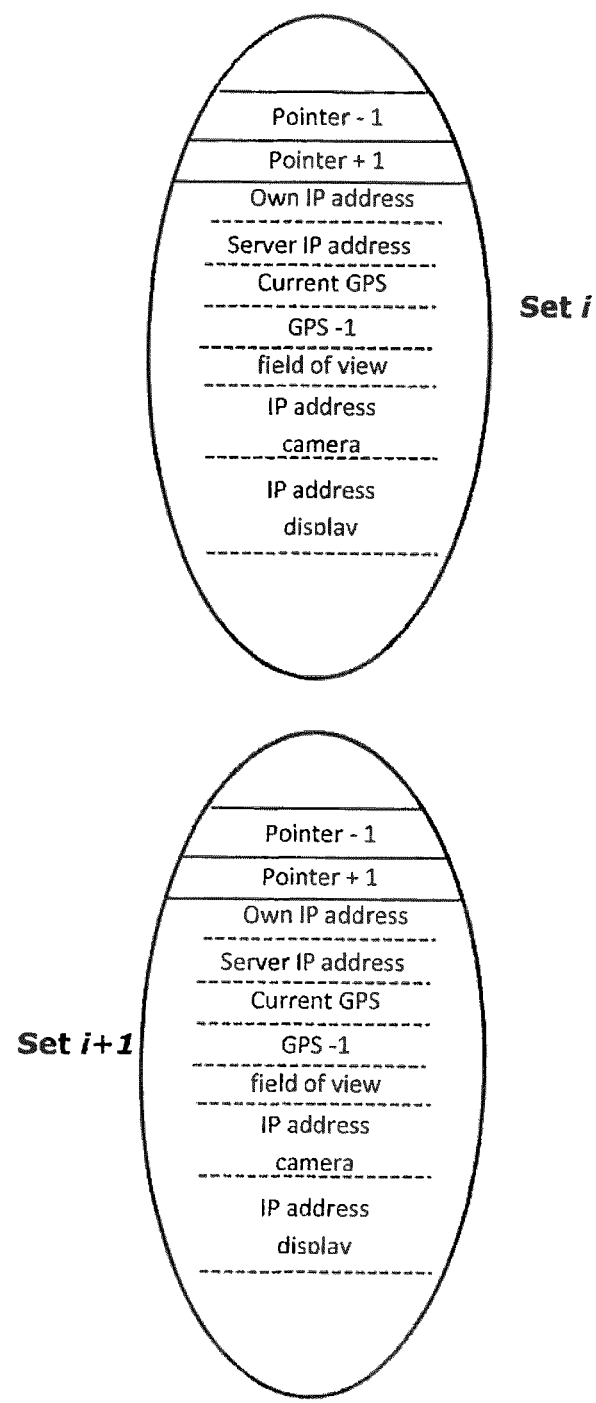
FIG. 5 illustrate an example of a data set structure according to the present invention.

An example of a data set as referenced above is illustrated in FIG. 5. Such sets of data may be configured as a matrix element, and each respective information element can be arranged and accessed with indexed addresses as known to a person skilled in the art. A same data set structure may be used for every kind of object being registered as users in the server system according to the present invention. The same data set structure may be used for a road user, a point of interest (POI), a shop, a tramway etc., but the actual content may differ as well as the use of a specific set of data. When a person or institution etc. is registering credentials with a server according to the present invention, some information elements are initialized such as a description or definition of a field of view the user wants to have. If the user omits registering a specific shape of the field of view, a default shape, for example a circle with diameter of 500 meter, or 200 meter etc., is set by the server. In another example of embodiment of the present invention a user might register other mobile phones or additional mobile units with GPS capabilities. The term "Mobile terminal" denotes all kind of units that might be used by road users, and other types of users, utilizing servers according to the present invention.

The traffic surveillance and guidance system according to the present invention can be a distributed system of servers across regions, cities, urban areas etc. but also across country borders. Therefore, it can be a plurality of server systems according to the present invention that cooperate and interchange data when a road user leaves a geographical area covered by a specific server, and comes into the geographical area covered by another server according to the present invention.

In an example of embodiment of the present invention the Internet address of the server the user is in contact with (for example via a WEB page) when registering, or is logging in as a user from for example a Mobile terminal in his car, will be part of the data set belonging to this specific user. When a user is logging in to the server with his user name and password, the data set associated with the user is identified and the server reads out the current GPS position the road user actually are located on and update the data set. Based on the GPS coordinates the server can decide if the road user now is in a geographical area served by the server. If the road users geographical position indicates that he should be served by another server, for example in another, city or country etc., the server transfers the data set associated with the road user to this specific other server, and may also update "current" server" address in the Mobile terminal of the user. In FIG. 5 the information element "current server" will be updated with the Internet address of the server serving the road user at any time. The information element "previous server" is the IP address of the server the user was in contact with within a specific geographical area before leaving this area and coming in contact with to new server in a next geographical area which then will be recorded as the "current server". Therefore, the update will be just to push the "current server" down to "previous server" each time a server change takes place because of a change of geographical area.

The server identified by "current server" is configured to track GPS positions of users and whenever a user leaves a geographical area served by the current server, the current server moves the data set of the user to the next server serving the next geographical area. This information is also updated in the Mobile terminal of the user. By keeping a record of near history events the server can keep track of unions stretching across respective geographical areas, and which can be used to move all members of a union across a geographical area of a server, or provide a split of the union etc. The assignment of servers to different geographical areas provides a simple mean of distributing load on the total system. In a sense a system of servers according to the present invention may be distributed across geographical areas just like cellular phone towers.

There is also an information element denoted "messages" in examples of a data set according to the present invention that are updated with current messages with date and time stamp sent within a union, or from the current server. Further, the information element "messages" may comprise a link to a video interface facilitating sending and receiving video streams to and from a video system installed in a car of the road user a specific data set is associated with. If a video stream is sent from a data set "A" i.e. user A, to another user B with data set "B" in a union between A and B the server moves video frames (steams) from the video interface of A to the video interface of B. When the interface of B receives video streams it knows by default that the video stream should be addressed to the display of the video system that B have.

The access to video cameras or video displays can be via a standard Internet session. The new trend with dash cams uses Internet as the preferred communication link. The interfaces of the video systems can then be implemented for example within the framework of WEB services as known to a person skilled in the art.

There is also an information element about current GPS positions of road users that is updated by the current server, for example at periodical intervals. A Mobile terminal can submit GPS positions via a prior art TCP socket and/or the server can query Mobile terminals at regular time intervals, or as part of other functions and events in the server that can happen at random time intervals etc. The set of data can also comprise the last GPS position identified before a new update of the GPS position is done. In this manner it is possible to identify the direction of travel of the road user, or if the road user is standing still. GPS positions may be read out with time stamps thereby also providing a possibility to estimate speed of travel, or if there is a queue this traffic condition can be verified just by comparing the speed estimate of other road users in a union or unions on a same road.

If for example the video field defined in set $S_i$ in FIG. 5 overlaps the video field of set $S_{i+1}$ a union is created. Details of how respective GPS positions and video field definitions can be used to detect a union between members are disclosed below.

Figure 6:
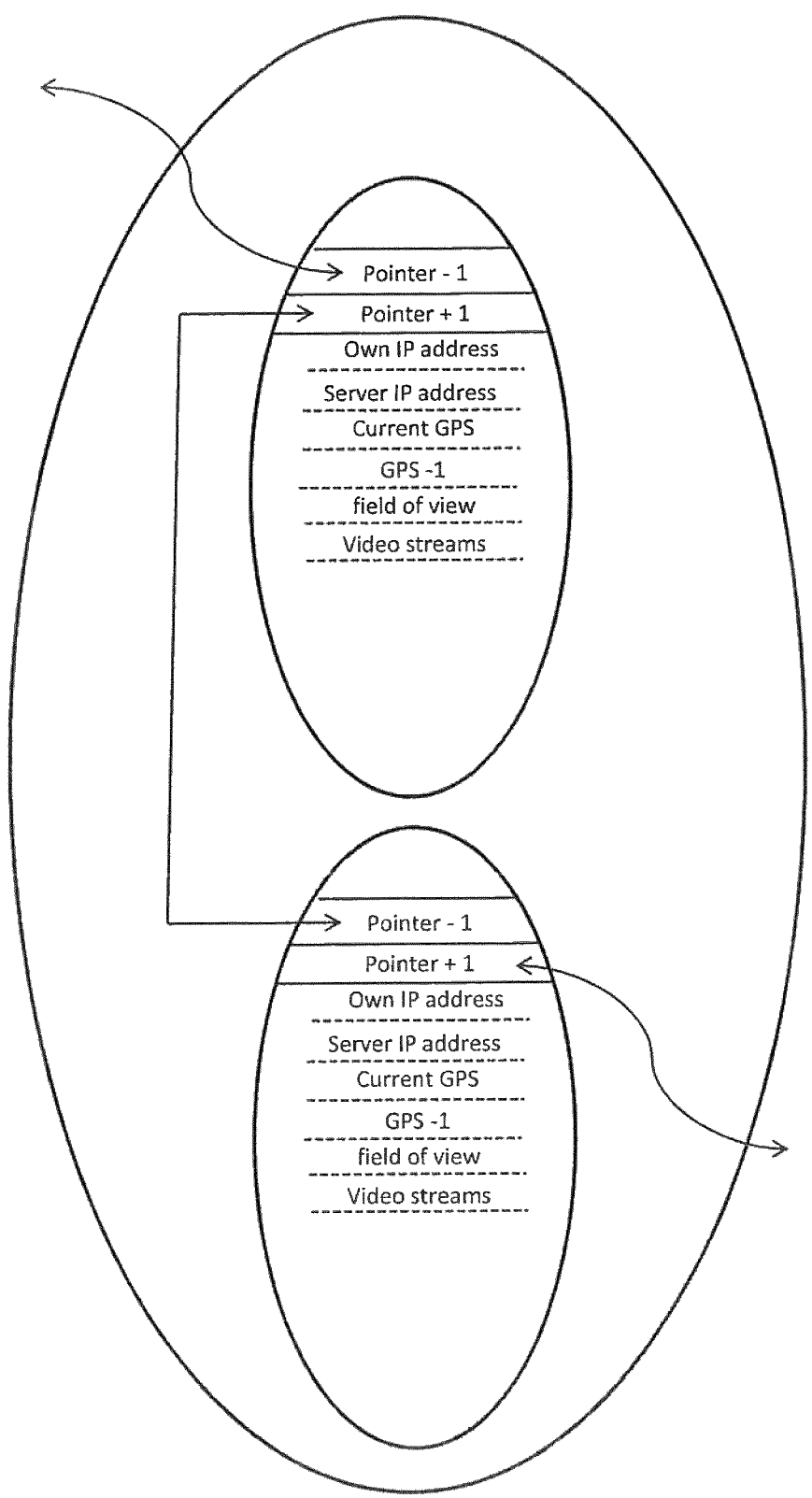
FIG. 6 illustrate another example of a data structure according to the present invention.

According to an example of embodiment of the present invention, a union is created simply by updating pointers as known to a person skilled in the art in each respective set of data associated with each road user coming into a union. In FIG. 6 a union is formed between set $S_i$ and set $S_{i+1}$ just by assigning a pointer "Pointer+1" to $S_i$ that points to the location storing the pointer "Pointer−1" of $S_{i+1}$. If these two sets are the only members of the created union, the pointer "Pointer−1" of $S_i$ is set to "NULL" indicating an end of the pointer chain, and the pointer "Pointer+1" of $S_{i+1}$ is also set to "NULL" to indicate the end of the pointer chain in the other end. Therefore, the union will be bounded and be identifiable among a plurality of sets associated with a plurality of users by two pointers that are "NULL" in a respective start and end of a linked list of data sets. If a user with an associated set of data $S_j$ (not shown) is not in a union, both the pointers "Pointer+1" and "Pointer−1" of $S_j$ will by default be set to "NULL". In this simple manner it is possible to identify both single members as well as respective unions of members of unions.

The pointer structure given as an example with reference to FIG. 6 comprises a forward chain of pointers and a backward chain of pointers. In FIG. 6 and in the description this has been simplified by using arrows and referring to pointers as pointing in both directions. In a practical example of embodiment there will be separate chains of pointers. A person skilled in the art knows how to program and use linked lists. There is an overview disclosed in a lecture note by R. Baumann of Hochshule Für Technik, Rapperswil, "Module Info1-Informatik 1 Learning Exercise—Linked Lists" that provides code examples of typical operations with linked lists.

If the union illustrated in FIG. 6 is coming in a union with a third road user with a data set $S_j$, the video field of the third road user will overlap either the video field defined in $S_i$ or $S_{i+1}$, or be overlapping both video fields defined in $S_i$ and $S_{i+1}$. However, a union $(S_i)U(S_{i+1})U(S_j)$ will be formed if the video field of $S_i$ or the field of view of $S_{i+1}$ overlaps the field of view of $S_j$ as known in set theory. Therefore, the process of determining the membership of a third road user with a data set $S_j$ can be achieved by parsing the sets of data between the "NULL" pointers encapsulating the union and compare the video field definitions of the respective members of the union with the video field of $S_j$, and if one of the defined video fields overlap the video field of $S_j$ the new member defined by the data set $S_j$ is incorporated into the union.

Therefore, the only required task when incorporating the data set $S_j$ is to update the <<NULL>> pointers in one of the ends of the linked list defining the union. Since the data set of $S_i$ has links pointing "upwards" ("Pointer−1") and "downwards" ("Pointer+1") to other data sets of other members of the union, it is possible to parse the nested pointer structure as depicted for example in FIG. 6, and the pointer field "Pointer+1" of a Set $S_i$ in one end of the linked list can be set to point to the "Pointer−1" of $S_j$ while the "Pointer+1" of $S_j$ is set to <<NULL>>. In this manner it is only necessary to identify only one overlapping video field among all video fields in a union, and a new member is incorporated into the union just by updating corresponding pointers in the linked list defining the union. Further, the server does not need to keep track of unions as such. A union is identified by identifying one of the members of a union, for example via a GPS position related to the member, and then parse the linked list of the union in both directions until a "NULL" pointer is encountered in both ends of the list. Thereby it is possible to identify unions as well as single users (users that are not members of a union).

A similar process of updating pointers in the data sets associated with users can be performed when a union is split. For example, if the third union $S_j$ is no longer in the union, this can be identified by having a process checking consistency of unions. In an example of embodiment of the present invention, all unions may at regular time intervals be dissolved and then reassembled again. In this manner the unions will comprise the correct members at any given time interval. The split is achieved by updating the respective pointers in all the involved sets of data of road users. The process will even create a spilt of a union as depicted in FIG. 4 into to new unions.

In another example of embodiment of the present invention the set of data linked with pointers in a union can be sorted with respect to for example the value of the "current GPS" position of the road users in the union. If members are driving in a same direction on a same road the information sharing can be more consistent, and the combined "video field" will also be more consistent with respect to what a road user can view in the union. When viewing forward it is actually a "viewing" forward that is preferred and not in random directions dependent on which union member is at which position in the linked list defining the union.

Since a data set may comprise both current GPS position and previous GPS position it is possible to sort members in a union driving for example on a same road also with respect to direction of travel. There are often two lanes on a road and members can be in a union despite opposite direction of travel. However, the traffic information road users have when coming towards a road user traveling in the opposite direction in the opposite lane can be of importance to the road user because information is coming from a location the road user is about to approach. Therefore, it is possible to create more than one linked list of members in a union, for example a linked list of road users for each lane on a road.

If there is a highway with multiple lanes in it can be advisable to create a separate linked list for those road users traveling in the lane on the far side of the road, for example. This lane is usually for cars departing off the highway to another road and traffic conditions for cars travelling in this road may be completely different from the conditions for the road users driving in other lanes on the high way. It is also possible to use the GPS positions and correlate these with existing road maps. Then actual city names, road lanes and destinations etc. can be identified and the current server can collect traffic information from other sources, for example from police of a specific city. Further, it is also possible to sort road users traveling on side roads of for example a main road identified by the GPS positions of road users in the union on these side roads, which can also be sorted further into linked lists related to driving directions.

These examples of sorting members of a union with respect for example to the geographical positions are examples of how it is possible to qualify message and/or video streams to road users that are only relevant for those road users.

A union is bounded by "NULL" pointers in both ends of a linked list. When incorporating other linked lists in a union as discussed above, the header and footer of the linked list defining the union can be followed by links defining start of "to the left" linked lists, "to the right" linked lists, "opposite direction" linked lists etc. and the footer of each of these links ends up in the footer of the linked list of the union. The literal meaning of the words "to the left" etc. are of course dependent on the direction of travel a road user actually is doing. However, the server is capable of correlating the content of such linked list with the direction of travel of a road user and can therefore interpret "to the left" etc. as being on the left or right of the direction of travel.

This concept does not violate the possibility to use the same data set structure for a single user as well as for a complex data structure of a union. The only requirement is to set pointers that are not used or that terminate lists in both ends of the lists to "NULL" as known to a person skilled in the art.

In this manner it is possible to qualify the concept of making unions of video fields to actual physical surroundings with traffic. This again enables the current server to qualify messages and/or videos sent in a union, not only to all members of a union, but also with respect to possible interest of the information that is sent out. It is of no interest for a road user to receive information about accidents that has happened at a location the road user is leaving behind. However, members traveling in an opposite direction can benefit from this information.

When identifying positions of cars driving in specific lanes, the resolution of the GPS system may be too low. However, it is within the scope of the present invention to incorporate hybrid location techniques as known in prior art. For example it is known how to combine GPS positioning with for example cell phone tower triangulation techniques. There is also an interesting technique disclosed in U.S. Pat. No. 8,362,949 by Qingxuan Yang et al with the title "GPS and MEMS hybrid location-detection architecture". The teaching discloses how for example an accelerometer; gyro etc. in a mobile terminal like a mobile phone can be combined with GPS information to provide improved geographical position accuracy of moving objects.

As indicated above, examples of data sets as illustrated in FIGS. 5 and 6 may comprise an information element "messages". This can be a stack of messages enabling a push and pop operation of messages. The communication link between software modules that is providing an encapsulation for example of a message stack of a specific data set for a specific user and a specific GSM terminal registered to a road user can be achieved via message oriented middleware (MOM) which is software and/or hardware infrastructures supporting sending and receiving messages between distributed systems, as known in prior art.

Another choice is a more "hardwired" solution based on standard Transmission Control Protocol (TCP) sockets. Application services being programs running for example on servers can create sockets on start-up of the application program, and which may be in a listening state. These sockets are waiting for initiatives from client programs. A TCP server may serve several clients concurrently, by creating a child process for each client and establishing a TCP connection between the child process and the client. Unique dedicated sockets are created for each connection. These are in established state, when a socket-to-socket virtual connection or virtual circuit (VC), also known as a TCP session, is established with the remote socket, providing a duplex byte stream.

A server may create several concurrently established TCP sockets with the same local port number and local IP address, each mapped to its own server-child process, serving its own client process. They are treated as different sockets by the operating system.

Figure 7:
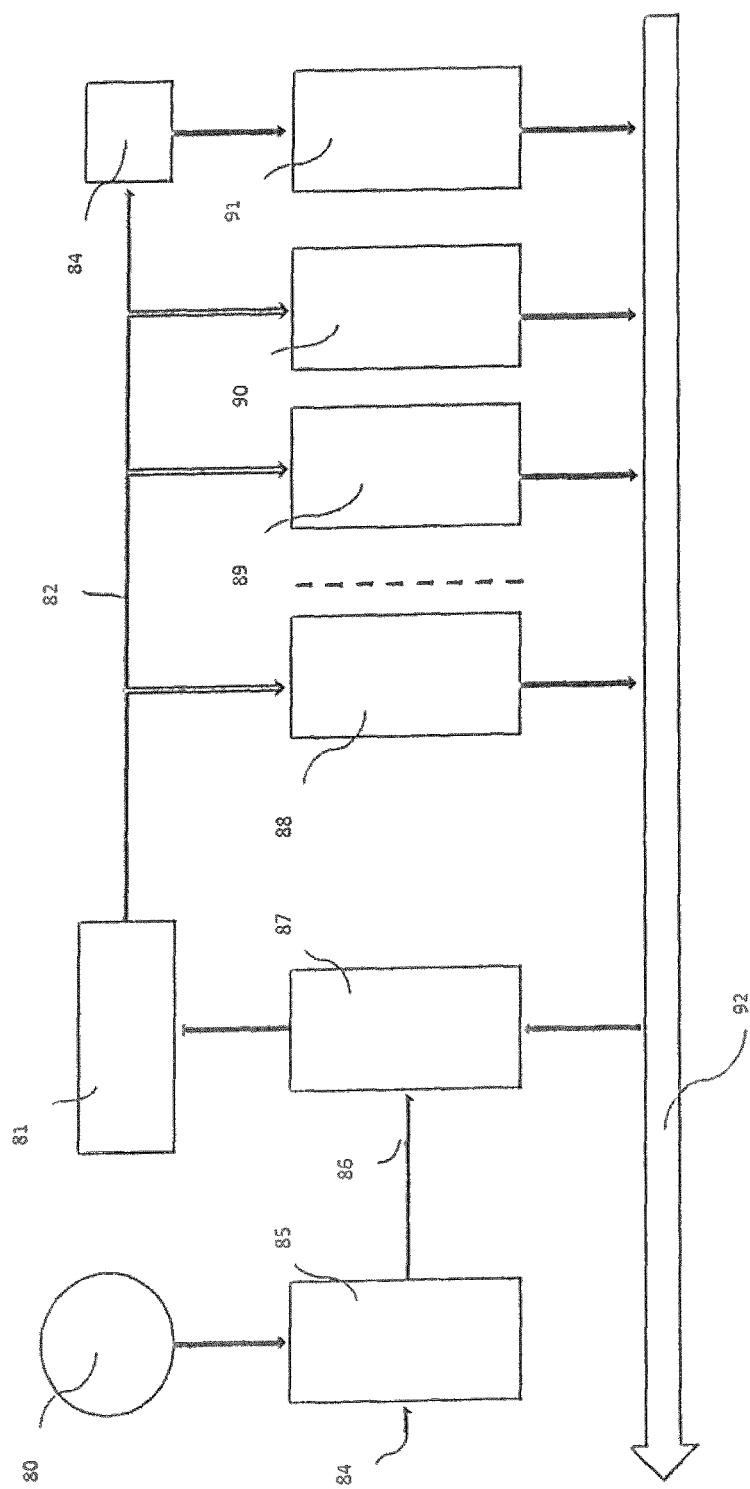
FIG. 7 illustrates an example of a structure enabling control of unions according to the present invention.

FIG. 7 illustrates an example of a "run time" system that can handle data structures and operations of data sets as discussed above.

In FIG. 7 a database 80 comprises respective user definitions and corresponding information in sets A, B, C etc., for example data sets as disclosed above. The database 80 that stores data sets comprising user profiles and other information elements can be located geographically close to a residential address of a user, and which was selected when a user registered as a user the first time. When a road user starts his car to drive away he can do this far away from this server, and even in another country, and when the road user wants to activate his membership and get access to services of the membership, he can log into a WEB page on the server he was using when registering as a user via for example a GPS navigation system, or a mobile phone, or any Mobile terminal or terminal of any kind the road user carries with him. When the server accepts the in-logging session the server reads out relevant information from the Mobile terminal that the road user is using, for example the actual GPS position from the Mobile terminal the road user is carrying with him (ref. "Current GPS" in FIG. 5) and the server can identify which server according to the present invention that serves the geographical area the road user now is presently located in based on the GPS position.

The associated data sets of users are transferred to an active user list 85 as depicted in FIG. 7, and the server updates GPS positions by reading out GPS coordinates 84 from users residing in the active user list 84 and update the related data sets. Then the updated GPS positions and field of view definitions are transferred over a communication link 86 to a process queue 87. However, it is within the scope of the present invention that users may be moving road users as well as stationary objects like a traffic light, a petrol station etc., and then there is no need for updating GPS positions. This can for example be achieved with a flag associated with the data elements for the GPS positions in the data sets indicating if the associated user of the data set is a stationary user or a mobile user.

A GPS processor 81 may randomly pick for example pairs of GPS coordinates from the process queue 87, and identify overlapping field of views between pairs of users. After the pair has been picked the pair is pushed off from the process queue 87. Dependent on the magnitude of distances between the pair of GPS coordinates that are picked, and the definitions of the respective field of views, the respective GPS coordinates together with the associated sets of data are then sorted into different priority queues 88, 89, 90. For example, if distances between perimeters of respective modelled field of views are identified to be greater than 1000 meters and there is no union, they are put into the priority queue 88. If the distance instead is less than 1000 meters, and there is no union, but the distance is greater than 500 meters the associated sets of data are put in the priority queue 89, while priority queue 90 can be for pair of data sets where the distance is less than 500 meters, but that are not forming unions. If the GPS processor 81 decides that there is at least a partly overlapping of field of views that satisfy conditions for a union, the associated data sets of the possible union are sent via a union rule decision process 83 that can decide if a creation of the union is allowed (rules associated with type of union, number of members in a union etc.). When the unions are allowed and formed they are transferred to a priority queue 91.

Data sets from all priority queues 88, 89, 90, 91 are transferred back to the process queue 87 that will comprise single sets A, B, C etc. and/or unions U1, U2, U3 etc. mixed with newly activated users from the active user list 85. When a data set enters the active user list 85 the server reads out GPS coordinates and updates the data sets in the active user list 85.

The respective priority queues 88, 89, 90, 91 are all circulated. Output from the priority queues are transferred back to the process queue 87 via a communication link 92. Since it is probable that users with a distance between perimeters of field of views that is greater than for example 1000 meters, it probably is a need of some times in the traffic to be able to form a union, the circulation of the priority queue 88 is slower than the other priority queues 89, 90 that are circulated quicker. In this manner there will be a random shifting of users being in the process queue 87. Unions are also circulated and an output from the union list 91 via the communication link 92. Since it is probable that a union will be active for a while, the unions are circulated slower. The speed of circulating the respective queues can be tuned in respective examples of embodiments. Besides providing priority between data sets, this example of embodiment also provides a load distribution of the server system itself.

It is further within the scope of the present invention to provide an optional sorting of users in the active user list 85 before they can be picked and placed in the process queue 87. In another example of embodiment, the users in the process queue 87 are picked according to geographical closeness between the pair of users that are being processed at any time.

The communication link 92 may also comprise a process of identifying and controlling if a GPS position is within the geographical area supported by the current server. If the GPS position is outside the geographical area the process in the communication link 92 signals the server about the situation, and the server is configured to transfer the data set associated with this GPS position to a next server being located adjacent to the geographical area of the current server. This is indicated with an arrow on the communication link 92.

The server may also be configured to parse the linked lists the data set to be transferred is part of. Then all members of a union being outside the geographical area of the current server are transferred to the next server. Those members that still may be able to be served by the current server forms a new union and will be transferred to the next server when their respective GPS positions indicating this. Then they can be members again of the union they were members of.

The link 92 can be a message bus for example implemented inside publisher subscriber architectures as known to a person skilled in the art. This enables a simple expansion of the system, also over networks to other servers. If there are assigned different servers to different geographical regions, the transfer of data sets from "current server" to a next server is simplified with such a message system within a framework of publisher subscriber solutions as known to a person skilled in the art. The server address, with respect to which server that is now current server, is updated in the data sets that are transferred to the next server.

According to another example of embodiment, all processing modules and/or functional units as well as sets are integrated into the system as units communicating over a network with an Internet protocol, for example using standard protocols for WEB services. In this manner scalability is maintained over separate server systems and within servers, and the implementation requires only communication between unique identified and definable addresses in the structure, as known to a person skilled in the art.

One of the tasks a current server is performing is calculating overlap between geometrical shapes of field of views defined and selected by users registering in the system. The shape of a field of view can be changed at any time. When trying to establish a partly overlap between different shapes and sizes, ordinary geometrical rules and calculus may be used. However, when investigating partly overlap of physical field of views among road users many simplifications may be done to ease the calculations. For example, an exact identification of an overlap is not necessary. If there are 5 meters left before an actual partly overlap happens it is of no significance if this situation is identified by the current server as being a real overlap. The same is true when identifying if a member is no longer a member, i.e. has no overlap with his field of view. If the spilt actually has happened, and the distance of the split is in the meter range it is of no significance if the road user is still detected as being member of the union. The important aspect is that the forming of unions and splitting of unions is provided for with a reasonable enough accuracy. This implies that complex shapes of field of views can be approximated to for example fields of view with simpler shapes that again provide simpler and quicker calculations. The inaccuracy this can provide is within the tolerance of detecting the process of creation and splitting of unions.

With reference to FIG. 5, an information element "IP video camera" can be initialised with the Internet address of a video camera a road user register when creating the user profile or data set. Further, the road user can register an information element "IP display" that is the Internet address for example of a video display system he register. It is further within the scope of the present invention that any video camera is optionally authenticated to be a video camera located in a car of the road user, and not an IP address of any other random video camera. In an example of embodiment of the present invention, a position of a video camera can be monitored by the traffic server system for example via cellular phone tower triangulation. The monitored GPS position of the road user itself can then be compared with the position of the video camera.

It is within the scope of the present invention that a video display system can be located outside the car of a road user. It is also within the scope of the present invention that a road user can distribute video to several destinations of his choice. In an example of a data set according to the present invention, more than one Internet address for video displays may be registered.

Even if a road user has a video camera and/or a video display the traffic surveillance and guidance system according to the present invention comprise assignment of optional parameter values modifying perception of video streams received by the road user when being in a union, and/or other activities in the union. For example, a road user can disable streaming of videos from the road users own camera while the road user is allowed to view video streams from others etc.

As disclosed above it is possible to sort members of unions in respective lists according to geographical positions. This may be used to stream a specific video stream from a road user located in a sorted sequence only to other road users residing in the same sorted sequence of data sets that are requesting the specific video stream. In the union depicted in FIG. 6 the information element "video streams" is symbolizing the streaming between the members of the union.

Such sorted lists may be sorted with respect to the geographical positions of road users in a union thereby lists of road users on respective side roads on a left and respectively right hand side of a selected direction of a main road relative to the side roads can be established.

When a road user wants to view video streams from other video cameras that are in a union with the road user, this can be achieved via an interaction tool configuration of a video display that the specific road user have, wherein the interaction tool is configured to request video streams from a specific video camera in the union by touching a graphical symbol representing the geographical position of the video camera relative to his own position on an interactive display surface of the video display, or by moving a cursor on the video display surface over the graphical symbol representing the video camera and then activate the selection with a push button of the interaction tool.

Figure 2:
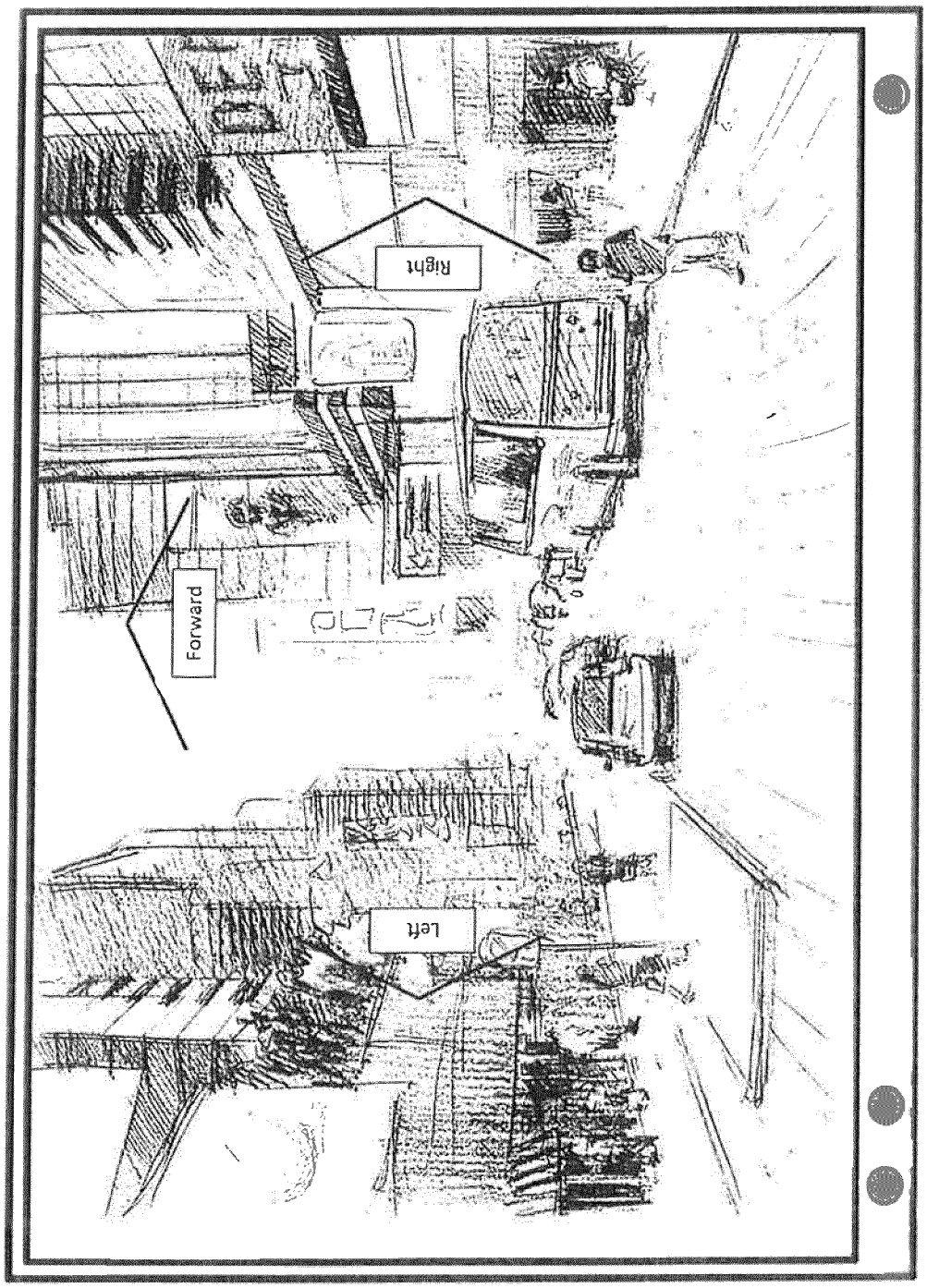
FIG. 2 illustrate an example of embodiment according to the present invention.

With reference to FIG. 2 it is also possible to use sorted lists of video cameras according to geographical positions to arrange lists where an interaction tool may be used to jump from one video camera in the list to a next video camera in the line. Therefore, it is possible to provide a sort of "zooming" from one camera to a next without knowing where the camera is actually located. However, if the cameras are sorted according to geographical positions in a forward direction this would be meaningful for a road user since this is the direction of travel. Likewise, if the road user intends to turn left, any selection of video cameras on his left side on the first side road appearing on his left side can be sorted out. The same scheme applied for any other direction. With reference to FIG. 2 there are arrows that point forward, left and right that can be activated by touching, and the touching will identify which sorted list that is of interest. The server is then configured to parse the linked list of cars that are located on the left hand side of the direction of travel of the road user sending the request, and the car being first in the list is then selected and video frames (streams) are sent from this first car on the left hand side to the road user requesting the vide stream. If the road user pushes once more on the same symbol the next car in the list is selected, and so on.

If a union comprises members from for example two side roads on the left, the sorted lists comprises two lists for the left hand side, for example left one, and left two.

When a road user pushes an arrow on his display indicating selecting a video camera next in line to the left, the geographical sorting criteria makes it probable that the video camera that is encountered is on the first road on the left hand side.

If a union have members driving in opposite directions on a main road, the meaning of "left" and "right" hand side will be opposite. Since the data set of road users is updated with current GPS position and previous position as indicated in FIGS. 5 and 6, this information can be used to qualify what is left and what is right hand side of the direction of travel. The same situation can be solved if a road user is driving on a side road. Then this road is the main road and the main road will be the side road. Therefore, the traffic server according to the present invention can sort out the meaning of left, right, forward, backwards etc.

Therefore, according to an example of embodiment of the present invention, an interaction tool configuration may comprise selecting a direction to a next video camera listed in lists of video cameras sorted according to geographical relative positions of the video cameras, and relative to an identified direction of travel of a road user making a request for a video stream, either a next video camera in line in front of the road user, or a next video camera in line to the left of the road user, or a next video camera in line to the right of the road user, or a next video camera in a line behind the road user.

The description of examples of implementations above is not intended to be a complete enabling description of a complete implementation, but highlights some of the features of the present invention and a data structure and a run time system enabling these features. The integration of these implementation details into existing computer systems and computing environments are known to a person skilled in the art.

Another aspect of the present invention is the ability to integrate an example of embodiment of the present invention into a social network. Social networks are characterized in providing social contact between people that has accepted each other as friends on the social network site. Such friends are usually family members and real friends from the ordinary social life. In addition it is possible to learn about other people and become friends with them.

The user registration of social networks can be adaptable to the user registrations required for an example of embodiment of the present invention. The more specialized aspects like defining a field of view etc. can be postponed to the first time a social network user access a service of the example of embodiment of the present invention. For example, on the social network site in the user profile registered there, it is possible to provide a link to the example of embodiment of the present invention which uses the user credentials of the social network and then prompts the user in an interactive session to provide registration of additional information.

The benefit of such a solution is that despite forming unions and splitting unions is by default an anonymous operation according to the present invention, the link to the social network can be used to parse a user's list of friends that is also using the example of embodiment of the present invention, and those friends that are online and is in a union with the user can be identified with real names in the union. This enables a session over the social network between the friends which can enhance the validity and relevance of traffic information in addition of the possibility to make an appointment of stopping and sharing a coffee at nearest road side restaurant, for example.

A further application of the concept of unions may be in security applications like an assault alarm system. When people move around and are for example being harassed by a person on a street for example, it is possible for the person to activate a symbol like "Danger" that feeds this message with position information to other people being nearby in a union with the person, The people in the union can then quickly come to the rescue of the person. If there are no persons in the union, the server of the system like the traffic server 20 will by default be in a union with the person and can automatically alert the police and send the coordinates of the location the person sent the "Danger" message from. In this example there is no difference in the technical infrastructure compared with a system directed towards "Traffic surveillance and Guidance" systems. Therefore it is a straight forward process of adapting the present concept of unions and examples of embodiments of this concept into other areas of interest. It is within the scope of the present invention to provide a system based on the concept of unions in any relevant field of technical applications utilizing the concept of unions.

If the assault system also provides a video field definition, a person being harassed may start a video stream from a mobile phone camera to the server, and within the concepts of unions a default video union between users with defined video fields and the server may exist all the time. Other persons coming to help a person in need may also start their mobile phone cameras. In this manner the server is capable of recording the situation as it is just when something is happening to a member of the system.

The invention claimed is:

1. A traffic surveillance and guidance system comprising:
a traffic server configured to provide acquisition of traffic information from a plurality of information providers; and
a plurality of registered road users of the traffic server, the traffic server being configured to receive and update and record data of geographical positions transmitted from mobile terminals associated with registered road users of the traffic server,
wherein a user profile of each registered road user includes a user defined geometrically shaped model and size of a geographical area the user is willing to share video streams of traffic conditions and incidents inside the geographical shaped modelled and sized area around the position the respective road users are located on at any time, and
video cameras and corresponding video displays are carried by the road users, or the video cameras and video displays are part of vehicles used by the road users when traveling,
wherein the traffic server is configured to follow movements of road users based on the received and recorded geographical positions, and detect when relative movements of road users is providing a situation with partial overlap of the respective modelled and sized geographical areas around at least a first road user and at least a second road user, and when a partial overlap is detected a video union is established between the at least two road users, wherein
the video union includes at least a video communication channel or video distribution process between the road users constituting the video union, and
the video communication channel or video distribution process is established via Internet streaming of video between Internet addresses of respective video cameras and video displays recorded in the respective user profiles of road users in the video union,
wherein when the traffic server is receiving a request from the at least first road user, having a registered video display, of video streams from a specific video camera registered with the at least second road user in the video union, the traffic server initiates Internet streaming of video via the Internet addresses of the specific video camera of the at least second road user to the Internet address of the video display of the at least first road user, and
the traffic server is further configured to monitor video unions that are constituted between road users, and whenever relative movements of a specific road user in a video union is providing a situation in which the specific road user no longer is having partly overlapping respective modelled and sized geographical area with at least one of the other road users in the video union, the traffic server is configured to disconnect the specific road user from the existing video communication channel or video distribution process in the video union such that the specific road user is no longer part of the video union.

2. The traffic surveillance and guidance system according to claim 1, wherein the video distribution process includes configuring a respective video interaction tool for each video camera being recorded in respective road user profiles.

3. The traffic surveillance and guidance system according to claim 1, wherein the video distribution process includes configuring a respective video interaction tool for a video display being recorded in respective road user profiles.

4. The traffic surveillance and guidance system according to claim 1, wherein the traffic server is configured to distribute video streams from a specific selected video camera in the video union, and then distribute the video stream to all other members of the video union.

5. The traffic surveillance and guidance system according to claim 1, wherein a road user streams video from the video camera registered in the road user's user profile to multiple Internet addresses of video displays registered in the road user's profile.

6. The traffic surveillance and guidance system according to claim 5, wherein at least one of the multiple video displays are located outside a car the road user is driving.

7. The traffic surveillance and guidance system according to claim 1, wherein the video distribution process includes assigning public video cameras located along public roads as road users of the traffic server with a defined video field, thereby allowing approaching road users with a defined video field to receive video streams from a specific public video camera when a video union is formed between them.

8. The traffic surveillance and guidance system according to claim 1, wherein a registration of a road user includes assignment of optional parameter values modifying perception of video streams received by the road user when being in a video union, or other activities in the video union.

9. The traffic surveillance and guidance system according to claim 1, wherein a registration of a road user includes assignment of an optional parameter value restricting video streams received by the road user to be video streams from road users traveling in a same direction as the road user.

10. The traffic surveillance and guidance system according to claim 1, wherein the received and recorded data of geographical positions of road users are used to sort respective road users of a video union in sequence in a list according to their geographical positions.

11. The traffic surveillance and guidance system according to claim 1, wherein a specific road user in a video union uses the received and recorded data of geographical positions of road users to request the traffic server to provide a sorting of other road users in the video union with respect to geographical positions of the other road users in the video union relative to the road user's current geographical position in a list accessible by the specific road user.

12. The traffic surveillance and guidance system according to claim 1,
wherein a specific road user in a video union uses the received and recorded data of geographical positions of road users to request the traffic server to provide a sorting of other road users in the video union with respect to geographical positions of the other road users in the video union relative to the road user's current geographical position, and
wherein the sorting of the other road users in the video union includes establishing respective lists of road users being on respective left or right side-roads in front of the road user's current geographical position in the traveling direction of the road user.

13. The traffic surveillance and guidance system according to claim 1, wherein the traffic server is configured to optionally authenticated a video camera to be the video camera of a specific road user.

14. The traffic surveillance and guidance system according to claim 1,
wherein registration of road users is made with reference to data from a user register of a computer implemented social network, and
wherein the traffic server is configured to parse a friends list in the social network of a first road user, and whenever the traffic server identifies a friend on the list being a second road user in a video union with the first road user, the traffic server notifies both road users about their presence in the same video union.

15. The traffic surveillance and guidance system according to claim 1,
wherein the traffic server is adapted to be part of an assault alarm system, and
wherein any registered user of the assault alarm system is optionally registered as a road users,
the assault alarm system is configured to identify registered names of persons being inside a video union and persons in surrounding areas of the video union, and then submit the names to a law enforcement authority when an alarm is issued by the assault alarm system and provide activation of any video camera being identified in the video union, or which are associated with persons surrounding the video union, and
wherein registered road users and their registered family members are by default inside a common video union regardless of the distance between family members of registered road users.

* * * * *